US008456179B2

(12) United States Patent
Iwasawa et al.

(10) Patent No.: US 8,456,179 B2
(45) Date of Patent: Jun. 4, 2013

(54) ANGULAR VELOCITY DETECTION DEVICE

(75) Inventors: Hiroshi Iwasawa, Hitachinaka (JP);
Toshiaki Nakamura, Hitachinaka (JP);
Masahiro Matsumoto, Hitachi (JP)

(73) Assignee: Hitachi Automotive Systems, Ltd.,
Hitachinaka-shi (JP)

( * ) Notice: Subject to any disclaimer, the term of this patent is extended or adjusted under 35 U.S.C. 154(b) by 221 days.

(21) Appl. No.: 13/129,927

(22) PCT Filed: Nov. 24, 2009

(86) PCT No.: PCT/JP2009/069807
§ 371 (c)(1),
(2), (4) Date: Jun. 24, 2011

(87) PCT Pub. No.: WO2010/064562
PCT Pub. Date: Jun. 10, 2010

(65) Prior Publication Data
US 2011/0260740 A1    Oct. 27, 2011

(30) Foreign Application Priority Data
Dec. 3, 2008    (JP) .................................. 2008-309127

(51) Int. Cl.
*G01R 27/26*    (2006.01)
*G01P 3/44*    (2006.01)
(52) U.S. Cl.
USPC ...... 324/658; 324/679; 73/504.04; 73/504.12
(58) Field of Classification Search
USPC ............... 324/679, 658, 649, 600; 73/504.01, 73/504.02, 504.03, 504.04, 504.07, 504.08, 73/504.11, 504.12, 504.17, 504.18
See application file for complete search history.

(56) References Cited

U.S. PATENT DOCUMENTS 6,516,665 B1 *    2/2003    Varadan et al. ............. 73/504.01
7,444,870 B2 *    11/2008    Uchiyama et al. ......... 73/504.12

(Continued)

FOREIGN PATENT DOCUMENTS

JP    7-128356 A    5/1995
JP    2008-64528 A    3/2008

OTHER PUBLICATIONS

Form PCT/IB/338 International Preliminary Report on Patentability (six (6) pages), Aug. 1, 2011.
International Search Report with partial English translation dated Jan. 26, 2010 (three (3) pages).

(Continued)

*Primary Examiner* — Hoai-An D Nguyen
(74) *Attorney, Agent, or Firm* — Crowell & Moring LLP (57) ABSTRACT

The present invention aims to provide an angular velocity detection device which is capable of reducing the effect of coupling between a drive electrode and a first displacement detection electrode by a floating capacity, and is low in cost. In the angular velocity detection device, an oscillating body 21 is displaceable in a first direction and a second direction which orthogonally intersect each other. The oscillating body 21 is oscillated in the first direction by an electrostatic force corresponding to a drive signal generated by a non-interference signal generator 1. A carrier signal generated by the non-interference signal generator 1 is applied to the oscillating body 21. A first displacement detection circuit 3 and a second displacement detection circuit 4 each detect a displacement of the oscillating body 21 as a displacement modulation signal indicative of a change in electrostatic capacity synchronized with the carrier signal to thereby detect an angular velocity. Here, the frequency of the drive signal and the frequency of the carrier signal are set so as to be generated at such a frequency ratio that a higher harmonic of the drive signal multiplied by an odd number does not the displacement modulation signal.

10 Claims, 8 Drawing Sheets

U.S. PATENT DOCUMENTS

| | | | |
|---|---|---|---|
| 8,113,051 B2 * | 2/2012 | Matsumoto et al. | 73/504.12 |
| 2007/0261488 A1 * | 11/2007 | Murashima | 73/504.04 |
| 2008/0245148 A1 * | 10/2008 | Fukumoto | 73/504.12 |
| 2011/0238363 A1 * | 9/2011 | Nakamura et al. | 702/141 |

OTHER PUBLICATIONS

Form PCT/ISA/237 dated Jan. 26, 2010 (three (3) pages).
Abstract of JP 2004-526942 (Mar. 21, 2008), Sep. 2, 2004.

* cited by examiner

ANGULAR VELOCITY DETECTION DEVICE

TECHNICAL FIELD

The present invention relates to an oscillation type angular velocity detection device, and in particular to an angular velocity detection device suitable for use in reducing a detection error caused by a floating capacity between wires.

BACKGROUND ART

Conventionally, a known angular velocity detection device utilizes a capacity change due to a displacement of an oscillating body (refer to, for example, Patent Document 1). The angular velocity detection device has drive means for oscillating the oscillating body, and displacement detecting means for detecting displacements of the oscillating body in a plurality of directions. Such a displacement detecting means is configured (hereinafter referred to as "a single-amp system") such that carrier signals of plural frequencies are applied to detection electrodes to detect a plurality of capacity changes, and charge signals are fetched out from a common terminal to perform capacity detection and detected based on the respective carrier signals to thereby detect respective displacement signals. Another displacement detecting means is configured (hereinafter referred to as "a multi-amp system") such that a single carrier signal is applied to a common terminal, charge signals are fetched out from a plurality of detection electrodes and capacity-detected using independent circuits, and they are detected based on the carrier signal to thereby detect respective displacement signals.

A comparison is made between the single-amp system and the multi-amp system. In the single-amp system, the common terminal of the oscillating body is directly coupled to a capacity detection circuit. For this reason, when a higher harmonic is contained in a drive signal, the higher harmonic is inputted directly to a capacity detection unit via a drive electrode. The drive signal generally uses a large amplitude to obtain a sufficient oscillation amplitude, and the scale (capacity) of the drive electrode is also large. Therefore, the input to the capacity detection becomes a very large amplitude, and not only large detection error occurs, but also there is a saturation of the capacity detection unit due to an excessive input in many cases. For this reason, the drive signal is required to use a waveform (e.g., sine wave) in which higher harmonic is sufficiently suppressed, and the need for a large-scale low-pass filter (LPF) at the generation of a signal, and the like arise, thus resulting in an increase in cost.

In contrast, the multi-amp system does not undergo the effect of a drive signal since the common terminal of the oscillating body is driven by a carrier generation unit and it is low in impedance. Accordingly, input based on the drive signal to the capacity detection unit via the common terminal does not take place. For this reason, a waveform (e.g., rectangular wave) containing a large number of higher harmonics multiplied by odd numbers can be used for the drive signal, with the waveform (e.g., rectangular wave) being easy to generate, thereby making it possible to achieve a reduction in cost. Since the rectangular wave may have a small voltage amplitude for generating as much electrostatic force as each sine wave of the same amplitude, there is a merit of reducing power supply voltage.

Prior Art References

Patent Document
 Patent Document 1: JP-2008-64528-A

SUMMARY OF THE INVENTION

Problems to be Solved by the Invention

The multi-amp system is accompanied by the problem that when there is a coupling caused by a floating capacity between a drive electrode and a detection electrode, a higher harmonic of a drive signal multiplied by an odd number is inputted to the capacitor detection unit via the floating capacity. When an input (displacement modulation signal) based on a displacement signal originally targeted for detection interferes with a frequency band, the higher harmonic of the drive signal multiplied by the odd number inputted via the floating capacity cannot be eliminated even though signal processing such as detection is used. This will cause a detection error, thus resulting in a problem.

In order to avoid this problem, there is considered a method is taken into account for cutting off a high frequency by performing the insertion of an LPF in the drive signal and the like. This will however cause an increase in cost. There is also considered a method for greatly keeping the distance between the drive electrode and its corresponding detection electrode, performing the insertion of a grounded guard pattern between the two, or the like to thereby reduce the floating capacity. This will also however cause an increase in cost due to an increase in chip area and wiring's complexity.

An object of the present invention is to provide an angular velocity detection device which is capable of reducing the effect of coupling between a drive electrode and a first displacement detection electrode by a floating capacity, and is low in cost.

Means for Solving the Problems (1) In order to achieve the above object, the present invention provides an angular velocity detection device having an oscillating body displaceable in a first direction and a second direction which orthogonally intersect each other, and detecting an angular velocity from a change in an electrostatic capacity due to a displacement of the oscillating body in the second direction in a state in which the oscillating body is oscillated in the first direction, the angular velocity detection device comprising: drive means which oscillates the oscillating body in the first direction by an electrostatic force corresponding to a drive signal; a carrier signal application unit which applies a carrier signal to the oscillating body; and a capacity detection unit which detects a displacement of the oscillating body as a displacement modulation signal which is a change in the electrostatic capacity synchronized with the carrier signal, wherein a frequency of the drive signal output by the drive means and a frequency of the carrier signal output by the carrier signal application unit are set so as to be generated at a frequency ratio which allows a higher harmonic of the drive signal multiplied by an odd number not to interfere with the displacement modulation signal.

Owing to such a configuration, the effect of coupling by a floating capacity between a drive electrode and a first displacement detection electrode can be reduced, and a reduction in cost is enabled.

(2) In the above (1), preferably, the drive means is equipped with a drive electrode, the capacity detection unit is equipped with a plurality of detection electrodes, the carrier signal application unit applies a single carrier signal to a common terminal of the oscillating body, the common terminal is electrically coupled in common to a movable electrode fixed to the oscillating body side within the drive electrode and all of movable electrodes fixed to the oscillating body side within the detection electrodes, and the capacity detection unit is equipped with independent circuits which detect capacities from charge signals each detected at the detection electrodes.

(3) In the above (1), preferably, servo means is provided which detects a change in the electrostatic capacity of the oscillating body in the second direction and acts so as to suppress its change, and the angular velocity is detected based on an amount of servo by the servo means.

(4) In the above (1) or (3), preferably, the frequency of a carrier signal generated by a non-interference signal generator is an odd multiple of the frequency of the drive signal.

(5) In the above (1) or (3), preferably, the frequency of a carrier signal generated by a non-interference signal generator is a frequency away by a bandwidth or more of an angular velocity signal from an even multiple of the frequency of the drive signal.

(6) In the above (1) or (3), preferably, the frequency of a carrier signal generated by a non-interference signal generator is a frequency away by 20 Hz or more from an even multiple of the frequency of the drive signal.

(7) In the above (1), preferably, a rectangular wave signal is used as the drive signal.

Effects of the Invention

According to the present invention, it is possible to reduce the effect of coupling by a floating capacity between a drive electrode and a first displacement detection electrode, and reduce in cost.

MODE FOR CARRYING OUT THE INVENTION

A configuration and operation of an angular velocity detection device according to a first embodiment of the present invention will be explained below with reference to FIGS. 1 through 9.

The configuration of the angular velocity detection device according to the present embodiment will first be described with reference to FIGS. 1 through 3.

Figure 1:
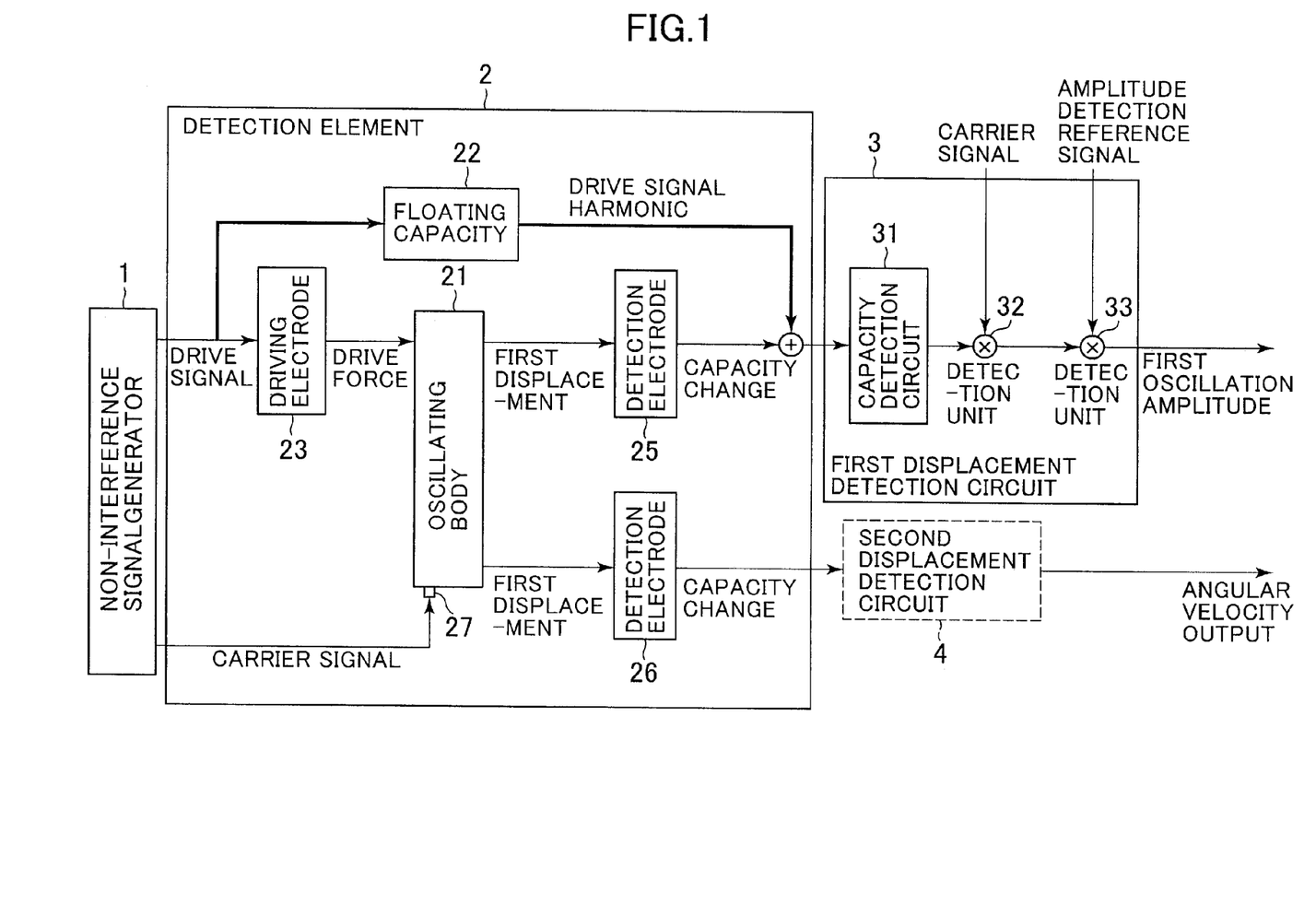
FIG. 1 is a block diagram showing a configuration of an angular velocity detection device according to a first embodiment of the preset invention.

FIG. 1 is a block diagram showing the configuration of the angular velocity detection device according to the first embodiment of the present invention. FIG. 2 is a block diagram illustrating a configuration of a non-interference signal generator used in the angular velocity detection device according to the first embodiment of the present invention. FIG. 3 is a block diagram depicting a configuration of a frequency divider used in the angular velocity detection device according to the first embodiment of the present invention.

As shown in FIG. 1, the angular velocity detection device according to the present embodiment is comprised of a non-interference signal generator 1, a detection element 2, a first displacement detection circuit 3, and a second displacement detection circuit 4.

The detection element 2 is comprised of an oscillating body 21 oscillably supported in a first direction and a second direction which orthogonally intersect each other, a first displacement detection electrode 25 which is disposed opposite to the oscillating body 21 and detects a displacement in the first direction, a second displacement detection electrode 26 which detects a displacement in the second direction similarly, a drive electrode 23 which is disposed opposite to the oscillating body 21 and applies electrostatic attraction in the first direction according to a drive signal, and a common terminal 27 which applies a single carrier signal to the oscillating body.

The first displacement detection electrode 25 is comprised of a movable electrode fixed to the oscillating body 21, and a fixed electrode disposed opposite to the movable electrode. The second displacement detection electrode 26 consists of a movable electrode fixed to the oscillating body 21, and a fixed electrode disposed opposite to the movable electrode. The drive electrode 23 consists of a movable electrode fixed to the oscillating body 21, and a fixed electrode disposed opposite to the movable electrode. The common terminal 27 is electrically coupled in common to the movable electrode of the first displacement detection electrode 25, the movable electrode of the second displacement detection electrode 26 and the movable electrode of the drive electrode 23.

Thus, the feature of the multi-amp system resides in that the single carrier signal is applied to the common terminal. Incidentally, another feature of the multi-amp system resides in that charge signals detected at a plurality of electrodes are capacity-detected by independent circuits respectively.

Figure 2:
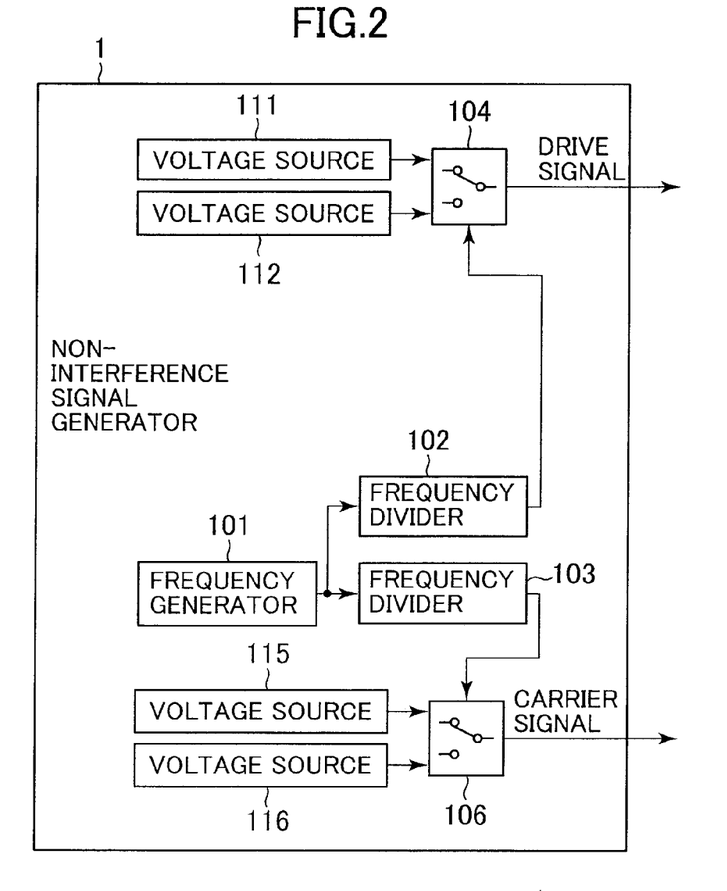
FIG. 2 is a block diagram illustrating a configuration of a non-interference signal generator used in the angular velocity detection device according to the first embodiment of the present invention.

As shown in FIG. 2, the non-interference signal generator 1 is comprised of a frequency generator 101, two frequency dividers 102 and 103, four voltage sources 111, 112, 115 and 116, and two switches 104 and 106.

Figure 3:
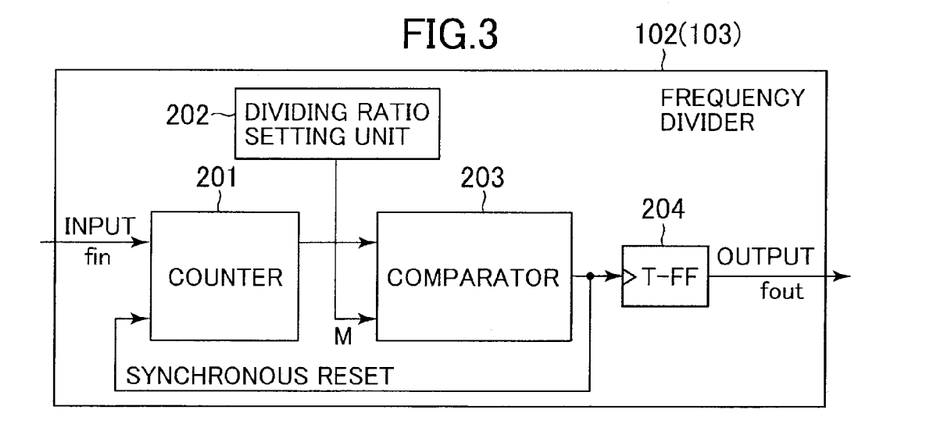
FIG. 3 is a block diagram depicting a configuration of a frequency divider used in the angular velocity detection device according to the first embodiment of the present invention.

As shown in FIG. 3, the frequency divider 102 consists of a counter 201, a comparator 203, a division ratio half-value setting unit 202, and a T flip-flop (T-FF) 204. Incidentally, the frequency divider 103 is also similar to the frequency divider 102 in configuration.

As shown in FIG. 1, the first displacement detection circuit 3 which serves as a signal processor, consists of a capacity detector 31, and two synchronous detection units 32 and 33. Incidentally, the second displacement detection circuit 4 is also similar to the first displacement detection circuit 3 in configuration.

As described above, the angular velocity detection device according to the present embodiment has the configuration of the multi-amp system wherein the single carrier signal is applied to the common terminal to fetch the charge signals from the plurality of detection electrodes, which in turn are respectively capacity-detected using the independent circuits, and the capacity-detected signals are detected using the carrier signal to detect their corresponding displacement signals.

The operation of the angular velocity detection device according to the present embodiment will next be explained. The present embodiment is characterized in that the frequency fc of a carrier signal generated by the non-interference signal generator 1 is of a frequency which is an odd multiple of the frequency fd of a drive signal.

The operation of the non-interference signal generator 1 will first be explained. The non-interference signal generator 1 generates a drive signal to be applied to the drive electrode 23 and a carrier signal to be applied to the common terminal 27 with a predetermined frequency ratio, and also generates a displacement reference signal that is a signal having the same frequency fd as the drive signal. The carrier signal is generated by selectively switching between the voltages of the voltage sources 115 and 116 of FIG. 2 using the switch 106 in accordance with the carrier frequency fc. Likewise, the drive signal is also generated by selectively switching between the voltages of the voltage sources 111 and 112 using the switch 104 in accordance with the drive frequency fd. The carrier frequency and the drive frequency are obtained by dividing a signal of an inherent frequency generated from the frequency generator 101 for generating the signal by the frequency dividers 102 and 103.

Each of the frequency dividers 102 and 103 shown in FIG. 3 implements a frequency division at an arbitrary even division ratio in accordance with the operation to be explained below.

The frequency dividers 102 and 103 have the same configuration except for the value of the division ratio half-value setting unit 20. Assuming that an input frequency is defined as fin, an output frequency is defined as fout, and the value (integer number) of the division ratio half-value setting unit 202 is defined as M, each of the frequency dividers outputs an output signal of a frequency shown below, based on the input signal fin:

$$fout=fin/2M$$

Here, the internal operation of each of the frequency dividers will be briefly explained with reference to FIG. 3. A counter 201 is counted up in response to the input signal, and the value counted is always compared with the value of the division ratio half-value setting unit 202 by the comparator 203. When they coincide with each other, the comparator 203 outputs a coincidence pulse. The division ratio half-value setting unit 202 is comprised of an ROM or the like and outputs a value M set in advance.

The T flip-flop 204 inverts a logical value of its output in response to the coincidence pulse of the comparator 203. The coincidence pulse is connected even to a synchronous reset input of the counter 201 and resets the counter to a value of "1" at the next input of the clock. With this configuration, the coincidence pulse is generated each time the clock is input M times, and the output corresponding thereto is inverted, thereby making it possible to implement a frequency divider having a division ratio of an arbitrary even number (2M). A value of Mc is set to the division ratio half-value setting unit 202 of the frequency divider 102, and a value of Md is set to the division ratio half-value setting unit 202 of the frequency divider 103. A relationship between the two is represented as follows:

$$Md=(2N+1)Mc$$

Accordingly, the carrier frequency fc output from the non-interference signal generator 1 shown in FIG. 2 becomes an odd multiple ((2N+1) times) of the drive frequency fd.

The operation of the detection element 2 will next be explained with reference to FIG. 1 and FIGS. 4 through 9.

Figure 4:
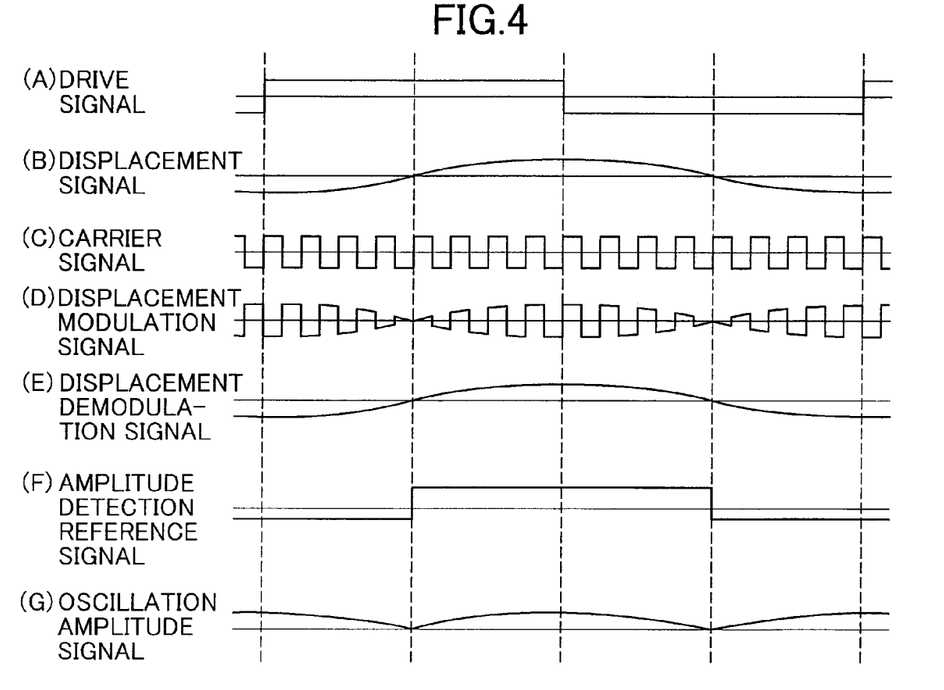
FIG. 4 is a schematic diagram of signal waveforms in the case where a problematic floating capacity 22 does not exist between a drive electrode 23 and a first displacement detection electrode 25.
Figure 5:
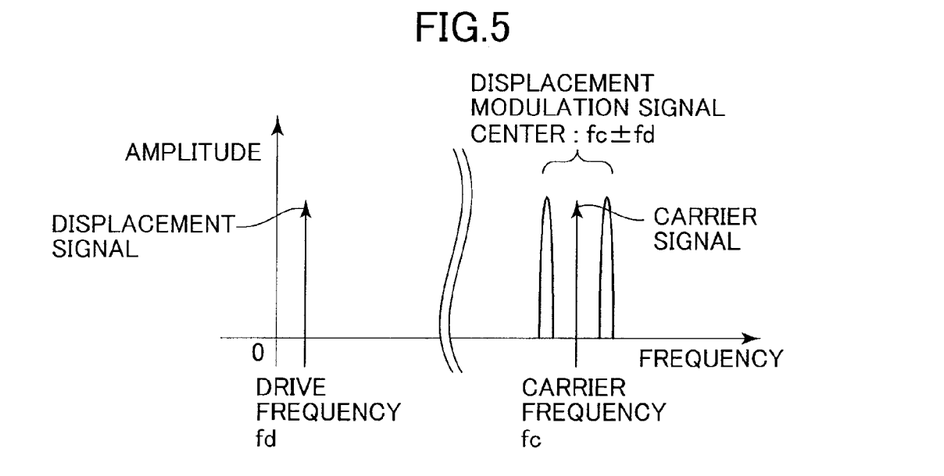
FIG. 5 is a frequency distribution diagram of respective signals in the case where no floating capacity 22 exists.

FIG. 4 is a schematic diagram of signal waveforms in the case where a problematic floating capacity 22 does no exist between the drive electrode 23 and the first displacement detection electrode 25. FIG. 5 is a frequency distribution diagram of respective signals in the case where no floating capacity 22 exists.

Figure 6:
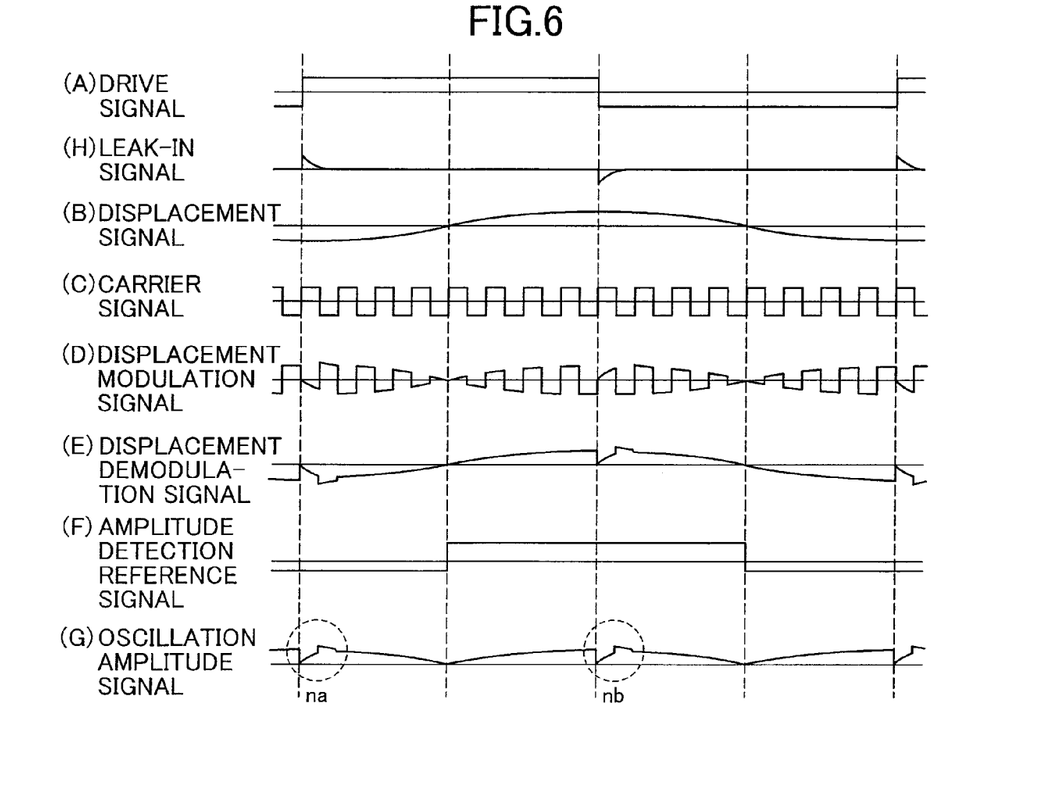
FIG. 6 is a schematic diagram of signal waveforms, as a comparative example, in the case where a carrier frequency fc is an even multiple of a drive frequency fd when the problematic floating capacity 22 exists between the drive electrode 23 and the first displacement detection electrode 25.
Figure 7:
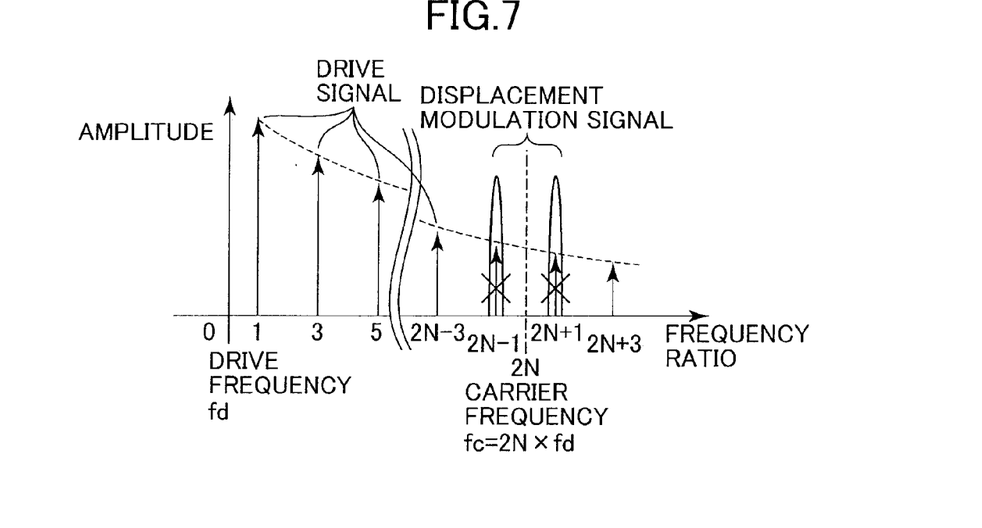
FIG. 7 is a frequency distribution diagram of respective signals, as a comparative example, in the case where the floating capacity 22 exists.

FIG. 6 is a schematic diagram of signal waveforms, as a comparative example, in the case where a carrier frequency fc is an even multiple of a drive frequency fd when the problematic floating capacity 22 exists between the drive electrode 23 and the first displacement detection electrode 25. FIG. 7 is a frequency distribution diagram of respective signals, as a comparative example, in the case where the floating capacity 22 exists.

Figure 8:
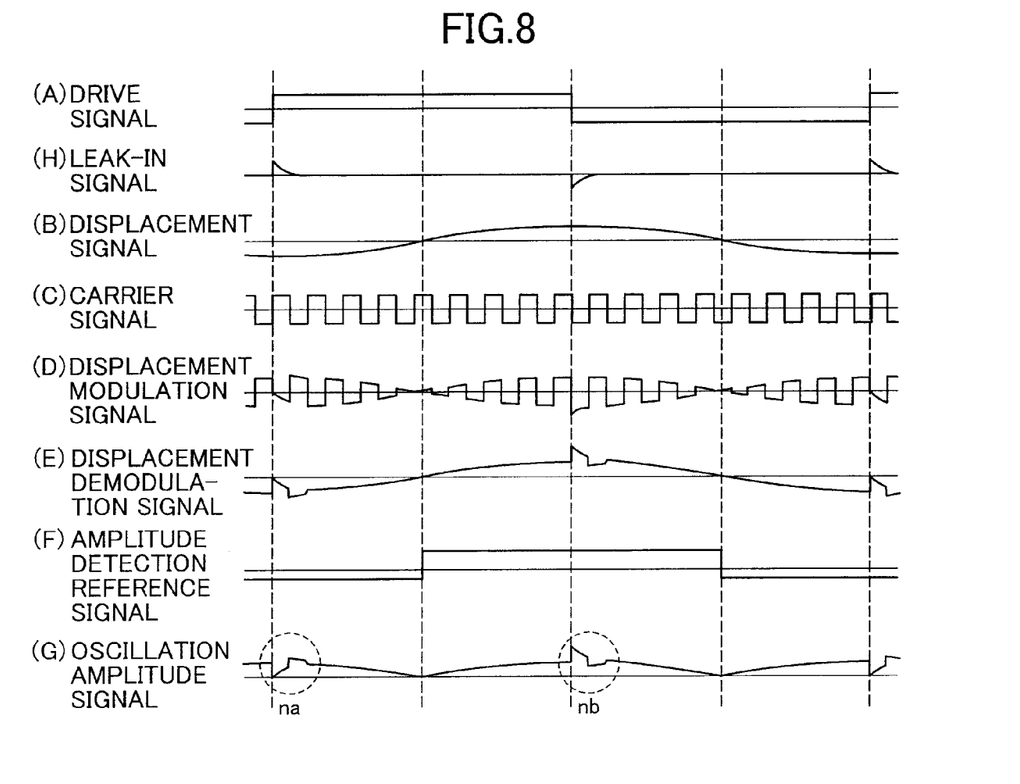
FIG. 8 is a schematic diagram of signal waveforms in the case where the carrier frequency fc is an odd multiple of the drive frequency fd when the problematic floating capacity 22 exists between the drive electrode 23 and the first displacement detection electrode 25 in the angular velocity detection device according to the first embodiment of the present invention.
Figure 9:
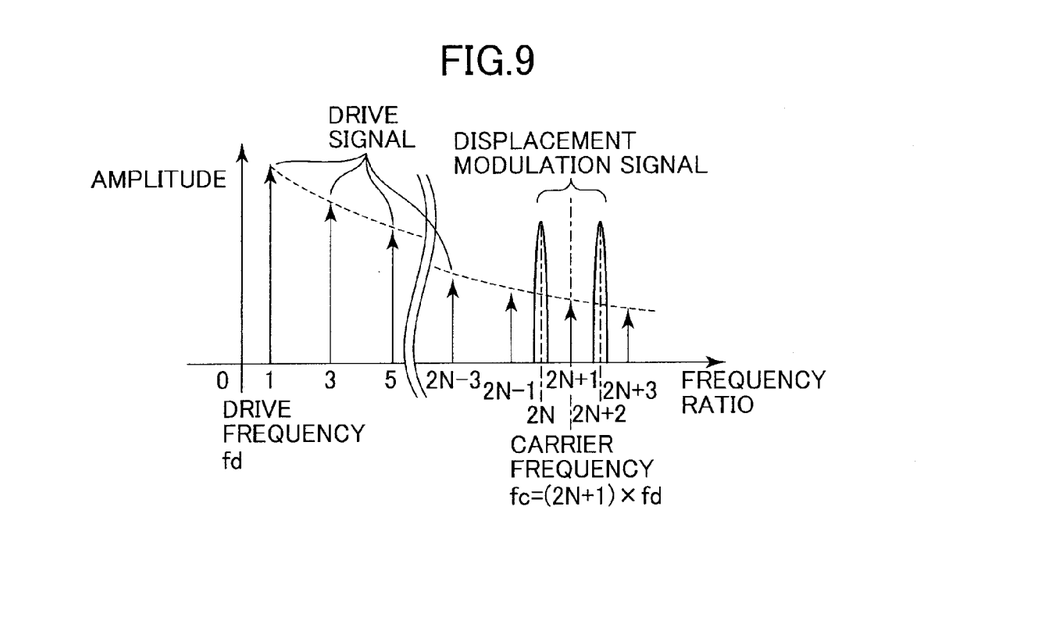
FIG. 9 is a frequency distribution diagram of respective signals in the angular velocity detection device according to the first embodiment of the present invention in the case where the floating capacity 22 exists.

FIG. 8 is a schematic diagram of signal waveforms in the angular velocity detection device according to the first embodiment of the present invention in the case where the carrier frequency fc is an odd multiple of the drive frequency fd when the problematic floating capacity 22 exists between the drive electrode 23 and the first displacement detection electrode 25. FIG. 9 is a frequency distribution diagram of respective signals in the angular velocity detection device according to the first embodiment of the present invention in the case where the floating capacity 22 exists.

In the angular velocity detection device according to the present embodiment, a drive signal generated from the non-interference signal generator 1 is applied to the drive electrode 23, and the oscillating body 21 is oscillated in the first direction by a generated electrostatic force. Likewise, a carrier signal generated from the non-interference signal generator 1 is applied to the common terminal 27. Then, the capacity of the first displacement detection electrode 25 changes depending on a displacement of the oscillating body 21 at the time of the oscillation thereof in the first direction, and a displacement modulation signal obtained by modulating the carrier signal with a displacement signal is inputted to the first displacement detection circuit 3 as a charge input.

Here, as shown in FIG. 4, such a displacement modulation signal of first displacement assumes a multiplication of the displacement signal by the carrier signal. In FIG. 4, FIG. 4(A) shows a drive signal, FIG. 4(B) shows a displacement signal, and FIG. 4(C) shows a carrier signal. FIG. 4(D) shows a displacement modulation signal, and FIG. 4(E) shows a displacement demodulation signal. FIG. 4(F) shows an amplitude reference signal, and FIG. 4(G) shows an oscillation amplitude signal.

As shown in FIG. 5, such a displacement modulation signal of first displacement has, if expressed in a frequency distribution, a spread of a bandwidth Bw1 of an oscillation amplitude signal in the first direction at each of the positive and negative sides, with centering on a frequency of fc±fd.

When an angular velocity is applied in this state, the Coriolis force acts on the oscillating body 21 in the second direction, so that the oscillating body 21 oscillates even in the second direction. With such an oscillation displacement in the second direction, the capacity of the second displacement detection electrode 26 changes, and a displacement modulation signal obtained by modulating the carrier signal with the displacement signal is inputted to the second displacement detection circuit 4 as a charge input. This displacement modulation signal of second displacement has, if expressed in a frequency distribution, a spread of a bandwidth Bw2 of an oscillation amplitude signal in the second direction at each of the positive and negative sides with centering on a frequency of fc±fd. Since the oscillation in the second direction is yielded by the input of the angular velocity, the bandwidth Bw2 of the oscillation amplitude signal in the second direction has the same bandwidth BwR as the angular velocity to be inputted.

The operation of the first displacement detection circuit 3 will next be explained. In order to detect the oscillation amplitude of the oscillating body in the first direction, the displacement modulation signal inputted as the charge signal is first converted to a voltage signal by the capacity detector 31. Then, the synchronous detection unit 32 performs a synchronous detection based on a multiplication with the carrier signal to obtain a displacement signal which is a signal indicative of an oscillation displacement. Thereafter, the synchronous detection unit 33 performs a synchronous detection based on a multiplication with a displacement reference signal to finally obtain an oscillation amplitude signal in the first direction. This signal contains pulsations, but is averaged to thereby enable the detection of the oscillation amplitude.

When the floating capacity 22 does not exist between the drive electrode 23 and the first displacement detection electrode 25, or is sufficiently small, the normal oscillation amplitude can be detected in accordance with the above operation as shown in FIG. 4. When the negligible floating capacity 22 exists between the two, spike-like noise becomes a leak-in signal on the rising edge/falling edge of a drive waveform where a rectangular wave is used for the drive waveform, which in turn is added to its corresponding capacity detection input through the floating capacity 22.

With reference to FIG. 6, a description will now be given of signal waveforms, as a comparative example, in the case where an even multiple of a drive frequency fd (e.g., 16 times) is used for a carrier frequency fc when the problematic floating capacity 22 exists between the drive electrode 23 and the first displacement detection electrode 25.

In FIG. 6, FIGS. 6(A) through 6(G) each show the same type of signals as those in FIGS. 4(A) through 4(G). FIG. 6(H) shows a leak-in signal.

As shown in FIG. 6, noise (na and nb in the drawing) are superimposed on the finally-obtained oscillation amplitude signal in the first direction as viewed in the same direction periodically, so that they assume DC-wise errors. For this reason, it is not possible to eliminate these effects even if they are averaged (na+nb≠0).

This is because as shown in FIG. 7, if the displacement modulation signal of the first displacement is expressed in the frequency distribution, higher harmonic of a drive signal overlaps and interferes with the displacement modulation signal.

Now, if the drive waveform can be set as a rectangular wave, it can be easily generated using only a logical circuit. For this reason, a reduction in cost is achieved, but the drive signal has such a frequency distribution that its higher harmonic is multiplied by an odd number as shown in FIG. 7.

Thus, when the frequency band of the unnecessary noise (higher harmonics of drive signal multiplied by odd numbers) interferes with the frequency band of the signal (displacement modulation signal) desired to be detected, it becomes difficult to separate the two from each other even though frequency conversion processing such as a synchronous detection and signal processing such as averaging are used. Accordingly, they result in detection errors. In order to avoid such a problem, there is considered a method for cutting off high frequencies by performing insertion of an LPF in the drive signal, and the like. This method will however cause an increase in cost. There is also considered a method for reducing a floating capacity by placing a long distance between the drive electrode and the detection electrode or inserting a grounded guard pattern between the two, and so on. However, this method will also cause an increase in cost due to an increase in chip area and wiring's complexity.

For this reason, in the present embodiment, the non-interference signal generator 1 is used which uses a frequency of an odd multiple (2N+1 times, e.g., 17 times) of the drive frequency fd as for the carrier frequency fc.

Here, the breadth of the frequency band for the displacement modulation signal which should not be made to interfere with the higher harmonics of drive signal multiplied by odd numbers, is determined according to the bandwidth of an angular velocity signal to be required. For example, in the case of an angular velocity detection device used for an automobile antilock brake system, the bandwidth of an angular velocity signal to be required generally ranges from about 20 Hz to about 30 Hz. Frequency components higher than those can be removed by an LPF or the like.

FIG. 8 shows signal waveforms in the case where the carrier frequency fc is an odd multiple of the drive frequency fd when the angular velocity detection device according to the present embodiment is used and the problematic floating capacity 22 exists between the drive electrode 23 and the first displacement detection electrode 25. In FIG. 8, FIGS. 8(A) through 8(H) each show the same type of signals as those in FIGS. 6(A) through 6(H).

As shown in FIG. 8, noise (na and nb in the drawing) are superimposed on the finally-obtained oscillation amplitude signal in the first direction as viewed in the opposite direction for each half period of the drive frequency fd. For this reason, the noise can be thereafter eliminated by an averaging process (na+nb=0).

This is because as shown in FIG. 9, if the displacement modulation signal of the first displacement is expressed in the frequency distribution, then each higher harmonic of a drive signal and the displacement modulation signal can be brought most away from each other. With this configuration, the oscillation amplitude in the first direction can be detected highly accurately.

The second displacement detection circuit 4 is also similar to the first displacement detection circuit 3 in configuration. The second displacement detection circuit 4 detects an oscillation amplitude in the second direction in accordance with a similar operation and outputs it as an angular velocity. With this configuration, the angular velocity can be detected highly accurately.

Assuming that the ratio between the carrier frequency and the drive signal is multiplied by an odd number, the higher harmonic of the drive signal multiplied by the odd number, and the frequency band of the displacement modulation signal can be brought most away from each other as shown in FIG. 9, thus making it possible to easily separate the two from each other. That is, if the higher harmonic of the drive signal multiplied by the odd number does not interfere with the frequency band of the displacement modulation signal, harmonic selective removal is enabled by signal processing such as its subsequent synchronous detection and averaging or the like.

In the present embodiment, as described in FIG. 1, the rectangular wave is used as the waveform of the drive signal as shown in FIG. 8(A) as the multi-amp system. Since the rectangular wave may be small in terms of the voltage amplitude for generating as much electrostatic force as each sine wave of the same amplitude, a reduction in the power supply voltage can be achieved. In contrast, although the rectangular wave is a waveform that contains a large number of higher harmonics multiplied by odd numbers, the higher harmonic of the drive signal multiplied by the odd number, and the frequency band of the displacement modulation signal can be separated from each other as described above, thereby making it possible to easily eliminate the effect of each higher harmonic.

Incidentally, although reference has been made to the fact that the frequency ratio between the drive signal and the carrier signal is multiplied by the odd number even in the angular velocity detection device described in Patent Document 1, the present embodiment is different in configuration from Patent Document 1 because the multi-amp system is used for detection of the displacement whereas the single-amp system is used for the angular velocity detection device described in Patent Document 1. The meaning of the purpose of multiplying the frequency ratio between the drive signal and the carrier signal by the odd number also differ between the present embodiment and the angular velocity detection device described in Patent Document 1. The present embodiment aims to remove the leak-in of the higher harmonic of the drive signal multiplied by the odd number due to the floating capacity, whereas the angular velocity detection device described in Patent Document 1 aims to efficiently discriminate the modulation signals of the first and second displacements mixed together at the oscillating body after they have been capacity-detected.

According to the present embodiment as described above, an angular velocity detection device can be obtained which is capable of reducing the effect of coupling between the drive electrode and the first displacement detection electrode by the floating capacity, and is low in cost.

A description will next be given of a configuration and operation of an angular velocity detection device according to a second embodiment of the present invention with reference to FIG. 1 and FIGS. 10 through 12. The configuration of the angular velocity detection device according to the present embodiment is similar to that shown in FIG. 1.

Figure 10:
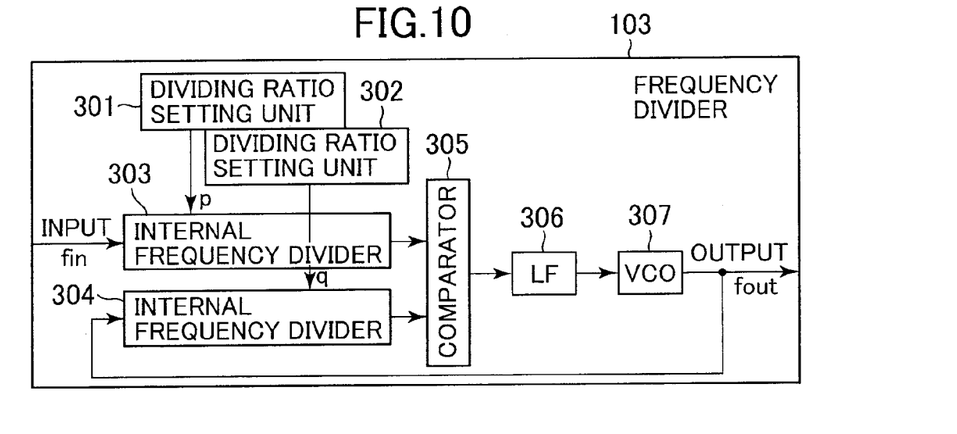
FIG. 10 is a block diagram showing a configuration of a frequency divider used in an angular velocity detection device according to a second embodiment of the present invention.
Figure 11:
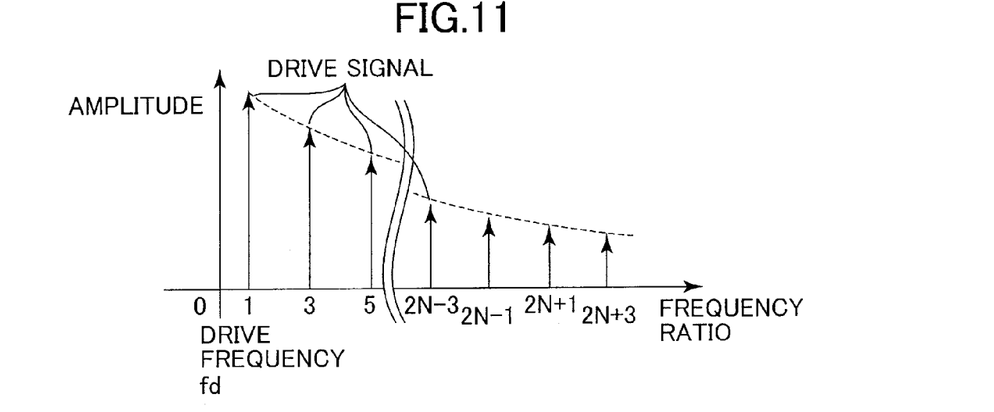
FIG. 11 is a frequency distribution diagram of respective signals in the angular velocity detection device according to the second embodiment of the present invention.
Figure 12:
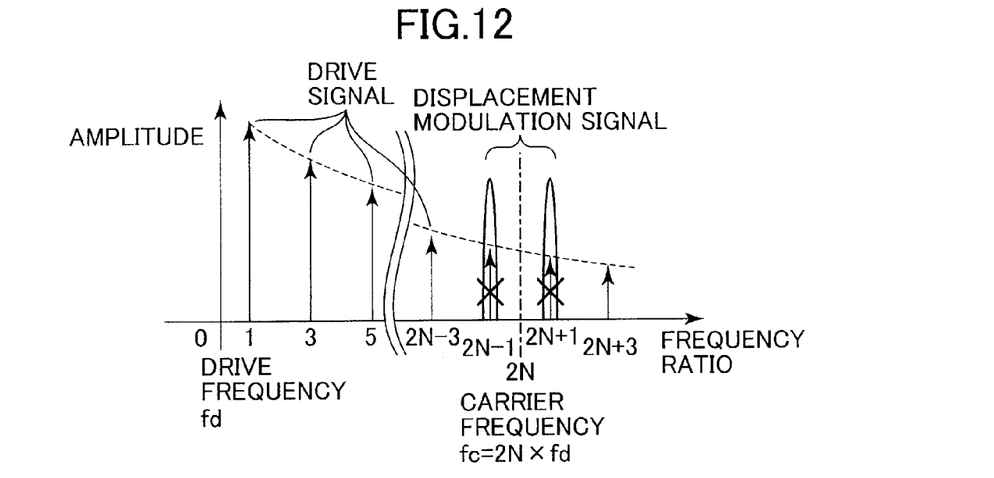
FIG. 12 is a frequency distribution diagram of respective signals in the angular velocity detection device according to the second embodiment of the present invention.

FIG. 10 is a block diagram showing a configuration of a frequency divider used in the angular velocity detection device according to the second embodiment of the present invention. FIGS. 11 and 12 are frequency distribution diagrams of respective signals in the angular velocity detection device according to the second embodiment of the present invention.

The present embodiment is different from FIG. 2 in terms of the relationship between the carrier frequency fc and the drive frequency fd outputted from the non-interference signal generator 1 shown in FIG. 2. A non-interference signal generator 1 used in the present embodiment is similar in basic configuration to that shown in FIG. 2. However, they are different from each other in the configuration of the frequency divider 103 and also differ from each other in that the division can be performed at a division ratio of an arbitrary rational number.

Here, a description will be made of the configuration of the frequency divider 103 used in the angular velocity detection device of the present embodiment with reference to FIG. 10.

The frequency divider 103 used in the present embodiment is comprised of division ratio half-value setting units 301 and 302, internal frequency dividers 303 and 304, a phase comparator 305, a loop filter 306, and a voltage controlled oscillator (VCO) 307.

The operation of the angular velocity detection device will next be explained. The angular velocity detection device according to the present embodiment is characterized in that a carrier signal frequency fc generated by the non-interference signal generator 1 is a frequency away by a bandwidth BwR or more of an angular velocity signal from an even multiple of a frequency fd of a drive signal. The present embodiment is similar to the first embodiment in terms of operations other than the above.

The frequency divider 103 achieves a division at a division ratio of an arbitrary rational number by using a configuration of a phase-locked loop (PLL) to be described below. Assuming now that an input frequency is defined as fin, an output frequency is defined as fout, the value of the division ratio half-value setting unit 301 is defined as p, and the value of the division ratio half-value setting unit 302 is defined as q, the frequency divider outputs a signal of a frequency to be shown below, based on the input signal:

$$f_{out}=f_{in}\times(q/p).$$

The internal operation of the frequency divider 103 will be briefly explained. As each of the internal frequency dividers 303 and 304, the frequency divider 102 that is used in the first embodiment, for implementing an even division ratio is used. The values of the division ratio half-value setting units 301 and 302 having values p and q are respectively set to the internal frequency dividers 303 and 304. The input signal is divided at a division ratio 2p by the internal frequency divider 303, which in turn is inputted to a non-inversion input of the phase comparator 305. The phase comparator 305 compares the phase of the signal from the non-inversion input and that of a signal at another inversion input and inputs a difference between the two to the loop filter 306 as a voltage signal. The loop filter 306 is of a filter which has frequency transfer characteristics for performing suitable phase compensation. The loop filter 306 transfers the signal input from the phase comparator 305 to the voltage controlled oscillator (VCO) 307. The voltage controlled oscillator 307 changes the frequency of an output signal in accordance with the input from the loop filter 306 and outputs it as the output of the frequency divider 103.

The output of the voltage controlled oscillator 307 is divided at a division ratio 2q by the internal frequency divider 304, which in turn is inputted to the inversion input of the phase comparator 305, whereby a feedback loop is configured. With this feedback loop, the difference in phase between the frequencies of the two input signals of the phase comparator 305 becomes zero, and the difference in frequency between the two also becomes zero.

At this time, the frequencies of the two input signals of the phase comparator 305 are respectively a non-inversion input (fin/2p) and an inversion input (fout/2q). Since they become equal to each other, the following equation is established:

$$fout = fin \times (2q/2p) = fin \times (q/p)$$

It is possible to implement a division at a division ratio of an arbitrary rational number.

The frequency divider 103 suitably selects the values p and q of the two division ratio half-value setting units 301 and 302 to thereby generate a carrier signal frequency fc at a frequency separated by a bandwidth BwR or more of an angular velocity signal from an even multiple of a frequency fd of a drive signal. Assuming that, for example, the value p is defined as 63 and the value q is defined as 1 when the carrier signal frequency fc is defined as 882 kHz and the frequency fd of the drive signal is defined as 14 kHz, the carrier signal frequency fc can be separated by 14 kHz from the even multiple of the frequency fd of the drive signal. This difference in frequency reaches the bandwidth BwR (e.g., 20 Hz) or more of the angular velocity signal.

A frequency relationship between signal groups in the present embodiment will next be explained with reference to FIGS. 11 and 12.

When the carrier signal frequency fc generated by the non-interference signal generator 1 is in the following relation as shown in FIG. 11 upon signal processing of the second displacement detection circuit 4 in particular:

$$fc > (2N \times fd + BwR),$$

the higher harmonic of the drive signal and a frequency distribution of a displacement modulation signal of a second displacement do not overlap each other because the bandwidth Bw2 of the oscillation amplitude signal in the second direction is equal to BwR as described above. When the oscillation amplitude signal in the second direction is demodulated through the two-stage synchronous detection units 32 and 33 in this state, its frequency distribution is represented as shown in FIG. 12. Since, at this time, a second oscillation amplitude signal corresponding to a signal to be detected, and a drive signal harmonic corresponding to a final noise component are away from each other at the frequency as shown in FIG. 12, they can be separated from each other by appropriate LPF processing, thereby enabling high-precision detection of an angular velocity.

Even when the carrier signal frequency fc generated by the non-interference signal generator 1 is in the following relationship:

$$fc < (2N \times fd - BwR),$$

a relationship of magnitude between the frequencies becomes simply reverse, and a similar relationship is hence established. For this reason, the higher harmonic of the drive signal and the frequency distribution of the displacement modulation signal of the second displacement do not overlap each other. Thus, since the second oscillation amplitude signal corresponding to the signal to be detected, and the drive signal harmonic corresponding to the final noise component are away from each other at the frequency, they can be separated from each other by the appropriate LPF processing, thereby enabling high-precision detection of an angular velocity.

To sum up, if the frequency of the carrier signal generated by the non-interference signal generator 1 is taken as the frequency separated by the bandwidth BwR or more of the angular velocity signal from the even multiple of the frequency of the drive signal, the second oscillation amplitude signal corresponding to the signal to be detected and the drive signal harmonic corresponding to the final noise component are away from each other at the frequency. Therefore, they can be separated from each other by the appropriate LPF processing, and high-precision detection of the angular velocity is hence enabled.

Incidentally, the angular velocity detection device used for the automobile antilock brake system generally needs to set the bandwidth BwR of the angular velocity signal to be detected to about 20 Hz or higher. For example, when the frequency of the carrier signal generated by the non-interference signal generator 1 is closer to 20 Hz from the even multiple of the frequency of the drive signal, the drive signal harmonic being a noise component enters into the oscillation amplitude signal in the second direction taken as the base for the frequency angular-velocity detection at a frequency less than or equal to 20 Hz. It becomes therefore difficult to eliminate the drive signal harmonic by the LPF or the like. It is thus desirable that when the angular velocity detection device is used for this end, the frequency of the carrier signal generated by the non-interference signal generator 1 becomes a frequency separated by 20 Hz or more from the even multiple of the frequency of the drive signal.

According to the present embodiment as described above, an angular velocity detection device can be obtained which is capable of reducing the effect of coupling between the drive electrode and the first displacement detection electrode by the floating capacity, and is low in cost.

A description will next be made of a configuration and operation of an angular velocity detection device according to a third embodiment of the present invention with reference to FIGS. 13 and 14.

Figure 13:
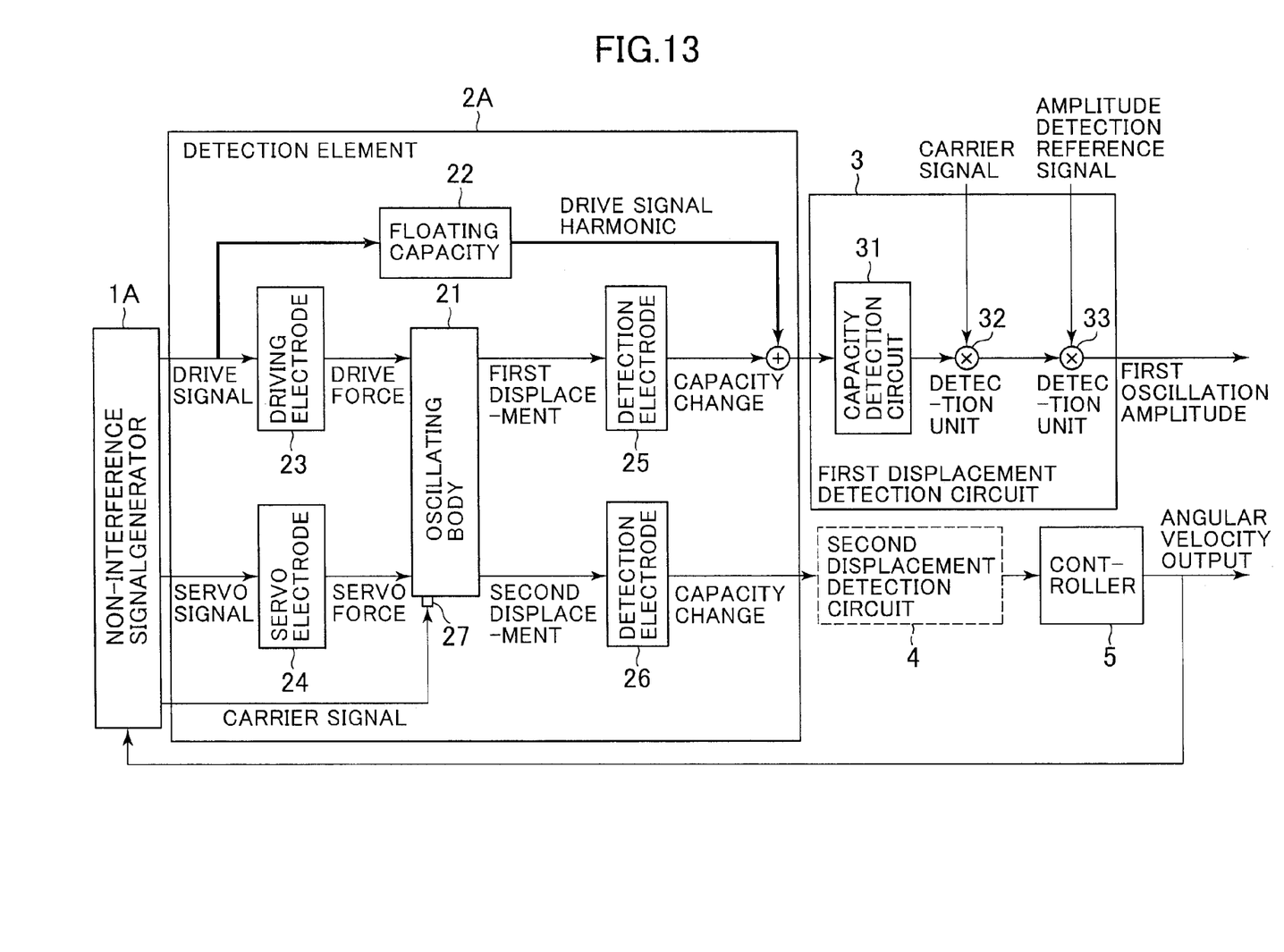
FIG. 13 is a block diagram illustrating a configuration of an angular velocity detection device according to a third embodiment of the present invention.

FIG. 13 is a block diagram showing the configuration of the angular velocity detection device according to the third embodiment of the present invention. FIG. 14 is a block diagram showing a configuration of a non-interference signal generator used in the angular velocity detection device according to the third embodiment of the present invention. Incidentally, in FIGS. 13 and 14, the same reference numerals as those shown in FIGS. 1 and 2 denote the same components.

As shown in FIG. 13, the present embodiment is characterized in that although the angular velocity detection device according to the present embodiment is almost the same as that according to the first embodiment in configuration, it is equipped with servo means (servo electrode 24 and controller 5) for suppressing an oscillation in a second direction, in addition to the above configuration.

As shown in FIG. 13, a detection element 2A used in the angular velocity detection device according to the present embodiment is provided with the servo electrode 24 which is disposed opposite to the oscillating body 21 and applies electrostatic attraction in the second direction in accordance with a servo signal, in addition to the configuration of the detection element 2 used in the first embodiment. The detection element 2A used in the present embodiment includes a first displacement detection circuit 3 and a second displacement detection circuit 4 identical in configuration to those in the first embodiment, and further includes the controller 5 provided in a stage subsequent to the second displacement detection circuit 4.

Figure 14:
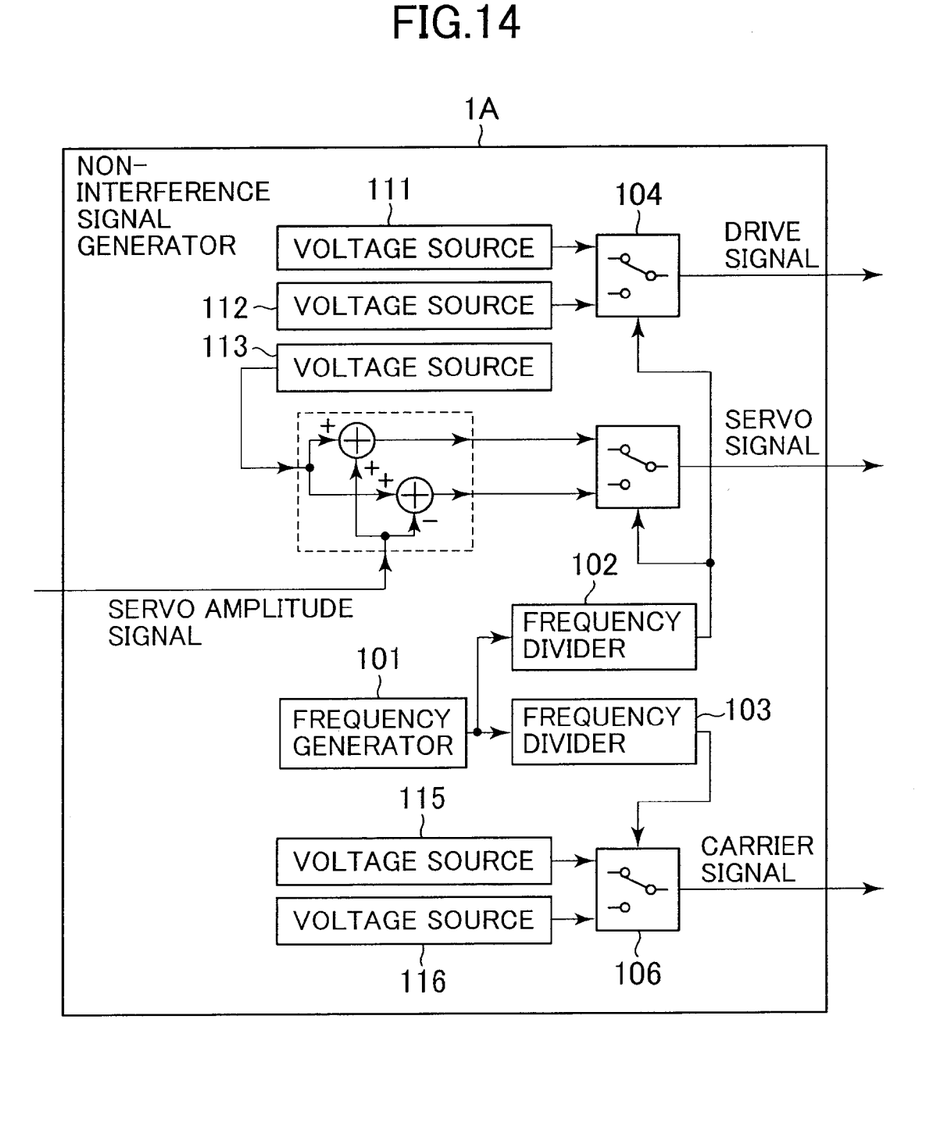
FIG. 14 is a block diagram showing a configuration of a non-interference signal generator used in the angular velocity detection device according to the third embodiment of the present invention.

As shown in FIG. 14, the non-interference signal generator 1A includes a voltage source 113, an adder-subtractor 107, and a switch 105, in addition to the configuration of the non-interference signal generator 1 employed in the first embodiment.

Next, the operation of the present embodiment will be explained. The present embodiment is also almost the same as the first embodiment in operation, but differs therefrom in that, as compared with the first embodiment, the output of the second displacement detection circuit 4, i.e., an oscillation amplitude signal in the second direction forms a zero-servo control loop without directly using it as an angular velocity output.

The output of the second displacement detection circuit 4, i.e., the oscillation amplitude signal in the second direction is inputted to the controller 5. A servo amplitude signal corresponding to the output of the controller is inputted to the non-interference signal generator 1. Then, the non-interference signal generator 1A generates a servo signal being a signal of the same frequency fd as a drive signal in accordance with operations to be described below, and applies it to the servo electrode 24.

The non-interference signal generator 1A is almost the same as the non-interference signal generator 1 employed in the first embodiment in operation, but differs therefrom in that the amplitude of the servo signal is changed according to the input of the servo amplitude signal in addition to the above operation. The input servo amplitude signal is added to and subtracted from the voltage of the voltage source 113 at the adder-subtractor 107 of the non-interference signal generator 1A, after which the results of addition and subtraction are both inputted to the switch 105. The switch 105 selectively switches between the two input voltages in accordance with a drive frequency fd generated from a frequency divider 102, and outputs the selected one as a servo signal.

With this configuration, the servo signal whose amplitude has been adjusted in accordance with the servo amplitude signal is generated based on the signal of the same frequency fd as the drive signal.

The control loop related o the oscillation amplitude in the second direction is configured by the above configuration. The controller 5 performs zero-servo control which controls the output in such a manner that the oscillation amplitude signal in the second direction corresponding to its input becomes zero. As a result, a Coriolis force and a servo force are balanced and hence the angular velocity input and the servo amplitude signal are proportional to each other. The angular velocity detection device according to the present embodiment outputs the servo amplitude signal as an angular velocity signal.

With the provision of this zero-servo configuration, the angular velocity can be detected without greatly displacing the oscillating body 21 in the second direction. A high-precision angular velocity detection device can therefore be achieved which is not affected by non-linearity of a support spring supporting the oscillating body 21 and non-linearity of the second displacement detection electrode.

Even in the present embodiment, the ratio between the carrier frequency and the drive signal is multiplied by the odd number as with the first embodiment. Consequently, the higher harmonic of the drive signal multiplied by the odd number and the frequency band of the displacement modulation signal can be brought most away from each other, thus making it possible to easily separate the two from each other.

That is, if the higher harmonic of the drive signal multiplied by the odd number does not interfere with the frequency band of the displacement modulation signal, harmonic selective removal is enabled by signal processing such as its subsequent synchronous detection and averaging or the like.

According to the present embodiment, as described above, an angular velocity detection device can be obtained which is capable of reducing the effect of coupling between the drive electrode and the first displacement detection electrode by the floating capacity, and is low in cost.

A description will next be made of a configuration and operation of an angular velocity detection device according to a fourth embodiment of the present invention.

The present embodiment is almost the same as the angular velocity detection device according to the second embodiment in configuration. In addition to it, as with the third embodiment, the present embodiment is, however, equipped with servo means (the servo electrode 24 and controller 5 in FIG. 13, and the configuration of the non-interference signal generator 1A shown in FIG. 14) for suppressing an oscillation in a second direction.

The configuration and operation of the servo means are the same as those of the servo means in the third embodiment. With this configuration, for the reason similar to that of the third embodiment, a high-precision angular velocity detection device can be achieved which is not affected by non-linearity of a support spring supporting the oscillating body 21 and non-linearity of the second displacement detection electrode.

Even in the present embodiment, as with the second embodiment, the frequency of the carrier signal generated by the non-interference signal generator 1 is set to the frequency away by the bandwidth BwR or more of the angular velocity signal from the even multiple of the frequency of the drive signal, so that the second oscillation amplitude signal corresponding to the signal to be detected and the drive signal harmonic corresponding to the final noise component are away from each other at the frequency. For this reason, they can be separated from each other by appropriate LPF processing, and high-precision detection of an angular velocity is hence enabled.

According to the present embodiment, as described above, an angular velocity detection device can be obtained which is capable of reducing the effect of coupling between the drive electrode and the first displacement detection electrode by the floating capacity, and is low in cost.

Incidentally, these embodiments are mere illustrations, and the present invention is by no means limited to or by the embodiments. Accordingly, the present invention can be improved and modified in various forms without departing from the gist of the present invention.

For example, although the rectangular wave is used as the drive waveform in each of the embodiments of the present invention, a waveform obtained by slightly blunting the rectangular wave using the LPF or the like may be used instead. In this case, a rise in cost due to the addition of the LPF occurs, but when the floating capacity 22 is large and the peak value of a leak-in signal is large as the capacity detector 31 becomes saturated, it is possible to suppress it. This is effective therefor. By the combined use of the LPF and the present invention, an angular velocity detection device can be achieved that can obtain a desired antinoise effect with an LPF small in scale or size as compared with the execution of countermeasures against noise by the single LPF, and that is low in cost.

In the respective embodiments of the present invention, the voltages of the voltage sources 111 and 112 for determining the amplitude of the drive signal are constant, but in order to stabilize the amplitude of the oscillation in the first direction, the values of the voltage sources 11 and 112 may be variably controlled in such a manner that the first oscillation amplitude signal detected by the first displacement detection circuit 3 becomes a constant value. Since the Coriolis force taken as the base for the detection of the angular velocity is proportional to the oscillation amplitude in the first direction, fluctuations in the oscillation amplitude in the first direction due to variations in power supply voltage and temperature, and fluctuations in the sealed pressure of the oscillating body 21, etc. can be suppressed by this configuration, thereby making it possible to achieve a high-precision angular velocity detection device.

In the respective embodiments of the present invention, the frequency generated from the frequency generator 101 which is used as the source for generating the carrier frequency fc and the drive frequency fd, is kept constant, but this frequency is variably set and thereby the drive frequency fd may be controlled so as to follow the resonant frequency of the oscillating body 21 in the first direction. With this configuration, a larger oscillation amplitude can be obtained by the voltage amplitude of the same drive signal, so that the power supply voltage can be lowered, thus making it possible to achieve a low-cost angular velocity detection device.

DESCRIPTION OF THE REFERENCE NUMERALS

1 . . . Non-interference signal generator
2 . . . Detection element
3 . . . First displacement detection circuit
4 . . . Second displacement detection circuit
5 . . . Controller
21 . . . Oscillating body
22 . . . Floating capacity
23 . . . Drive electrode
24 . . . Servo electrode
25 . . . First displacement detection electrode
26 . . . Second displacement detection electrode
27 . . . Common terminal
31 . . . Capacity detection circuit
32 . . . Synchronous detection unit (carrier frequency)
33 . . . Synchronous detection unit (drive frequency)
101 . . . Frequency generator
102 . . . Frequency divider (drive frequency)
103 . . . Frequency divider (carrier frequency)
104, 105, 106 . . . Switches
107 . . . Adder-subtractor
111, 112, 113, 115, 116 . . . Voltage sources
201 . . . Counter
202 . . . Division ratio half-value setting unit
203 . . . Comparator
204 . . . T flip-flop
301, 302 . . . Division ratio half-value setting units
303, 304 . . . Internal frequency dividers
305 . . . Phase comparator
306 . . . Loop filter
307 . . . Voltage controlled oscillator

The invention claimed is:

1. An angular velocity detection device including an oscillating body displaceable in a first direction and a second direction which orthogonally intersect each other, and detecting an angular velocity from a change in an electrostatic capacity due to a displacement of the oscillating body in the second direction in a state in which the oscillating body is oscillated in the first direction, the angular velocity detection device comprising:

drive means which oscillates the oscillating body in the first direction by an electrostatic force corresponding to a drive signal;
a carrier signal application unit which applies a carrier signal to the oscillating body; and
a capacity detection unit which detects a displacement of the oscillating body as a displacement modulation signal which is a change in the electrostatic capacity synchronized with the carrier signal,
wherein a frequency of the drive signal output by the drive means and a frequency of the carrier signal output by the carrier signal application unit are set so as to be generated at a frequency ratio which allows a higher harmonic of the drive signal multiplied by an odd number not to interfere with the displacement modulation signal.

2. The angular velocity detection device according to claim 1,
wherein the drive means comprises a drive electrode,
wherein the capacity detection unit comprises a plurality of detection electrodes,
wherein the carrier signal application unit applies a single carrier signal to a common terminal of the oscillating body,
wherein the common terminal is electrically coupled in common to a movable electrode fixed to the oscillating body side within the drive electrode and all of movable electrodes fixed to the oscillating body side within the detection electrodes, and
wherein the capacity detection unit comprises independent circuits which detect capacities from charge signals each detected at the detection electrodes.

3. The angular velocity detection device according to claim 1, further comprising:
servo means which detects a change in the electrostatic capacity of the oscillating body in the second direction and acts so as to suppress the change,
wherein the angular velocity is detected based on an amount of servo by the servo means.

4. The angular velocity detection device according to claim 1,
wherein the frequency of a carrier signal generated by a non-interference signal generator is an odd multiple of the frequency of the drive signal.

5. The angular velocity detection device according to claim 1,
wherein the frequency of a carrier signal generated by a non-interference signal generator is a frequency away by a bandwidth or more of an angular velocity signal from an even multiple of the frequency of the drive signal.

6. The angular velocity detection device according to claim 1,
wherein the frequency of a carrier signal generated by a non-interference signal generator is a frequency away by 20 Hz or more from an even multiple of the frequency of the drive signal.

7. The angular velocity detection device according to claim 1, wherein a rectangular wave signal is used as the drive signal.

8. The angular velocity detection device according to claim 3, wherein the frequency of a carrier signal generated by a non-interference signal generator is an odd multiple of the frequency of the drive signal.

9. The angular velocity detection device according to claim 3,
wherein the frequency of a carrier signal generated by a non-interference signal generator is a frequency away by a bandwidth or more of an angular velocity signal from an even multiple of the frequency of the drive signal.

10. The angular velocity detection device according to claim 3,
wherein the frequency of a carrier signal generated by a non-interference signal generator is a frequency away by 20 Hz or more from an even multiple of the frequency of the drive signal.

* * * * *